(12) United States Patent
Tsuruta et al.

(10) Patent No.: US 6,708,747 B1
(45) Date of Patent: Mar. 23, 2004

(54) PNEUMATIC RADIAL TIRES

(75) Inventors: Makoto Tsuruta, Kodaira (JP); Atsushi Yamada, Kodaira (JP)

(73) Assignee: Bridgestone Corporation, Tokyo (JP)

(*) Notice: Subject to any disclaimer, the term of this patent is extended or adjusted under 35 U.S.C. 154(b) by 435 days.

(21) Appl. No.: 09/549,703

(22) Filed: Apr. 14, 2000

Related U.S. Application Data

(63) Continuation-in-part of application No. 09/377,150, filed on Aug. 19, 1999, now abandoned.

(30) Foreign Application Priority Data

| Aug. 19, 1998 | (JP) | 10-232683 |
|---|---|---|
| Nov. 11, 1998 | (JP) | 10-320472 |
| Jul. 28, 1999 | (JP) | 11-213344 |

(51) Int. Cl.⁷ .............. B60C 9/18; B60C 9/22; B60C 9/28
(52) U.S. Cl. .............. 152/526; 152/527; 152/531; 152/535; 152/538
(58) Field of Search .............. 152/526, 533, 152/527, 535, 538, 454, 531

(56) References Cited

U.S. PATENT DOCUMENTS

| 4,702,293 A | * 10/1987 | Iwata et al. | 154/454 |
|---|---|---|---|
| 5,054,532 A | * 10/1991 | Kohno | 152/527 |
| 5,553,646 A | * 9/1996 | Ando | 152/209 |
| 5,804,002 A | * 9/1998 | Nakano | 152/527 |

FOREIGN PATENT DOCUMENTS

| DE | 3108140 | * | 1/1991 |
|---|---|---|---|
| EP | 0 384 558 | | 8/1990 |
| EP | 0 511 797 A1 | | 11/1992 |
| EP | 0 573 237 A1 | | 12/1993 |
| FR | 2 566 334 | | 12/1985 |
| GB | 2 072 590 A | | 10/1981 |
| JP | 2 141 306 | | 5/1990 |
| JP | 2-208101 | | 8/1990 |
| JP | 05338406 | * | 12/1993 |
| JP | 6 344 721 | | 12/1994 |
| WO | 99/24270 | | 5/1999 |

* cited by examiner

*Primary Examiner*—Jeff H. Aftergut
*Assistant Examiner*—Justin Fischer
(74) *Attorney, Agent, or Firm*—Sughrue Mion, PLLC

(57) ABSTRACT

A pneumatic radial tire comprises a radial carcass, a cross belt comprised of at least two belt layers, a belt reinforcing member arranged adjacent to the belt and comprised of at least one belt reinforcing layer containing a reinforcing element embedded therein and extending in a circumferential direction while bending in form of wave or zigzag, and a tread rubber, in which the widthwise outer end of the belt reinforcing member is located outward from the widthwise outer end of the widest-width belt layer, or a belt protection member is disposed in the neighborhood of the belt so that the widthwise outer end of the belt protection member is located outward from the widthwise outer end of the belt reinforcing member in a widthwise direction of the tire.

4 Claims, 4 Drawing Sheets

PNEUMATIC RADIAL TIRES

This application is a continuation-in-part of the application Ser. No. 09/377,150 filed Aug. 19, 1999 now abandoned.

BACKGROUND OF THE INVENTION

1. Field of the Invention

This invention relates to a pneumatic radial tire comprising a belt comprised of at least two belt layers and a belt reinforcing layer for the belt embedded therein with a reinforcing element extending in a circumferential direction while bending in wavy form.

2. Description of Related Art

Recently, the profile flattening of the tire proceeds with the lowering of a floor in a vehicle. As the tire becomes flattened, the outward growth of tire size in a tread portion in a radial direction becomes larger in the inflation under an internal pressure and hence separation failure is easily caused at an end of a belt to lower the tire durability.

In order to solve this problem, there has been proposed a pneumatic tire as described in JP-A-2-208101. This tire comprises a radial carcass toroidally extending between a pair of bead portions, a belt disposed at an outside of the radial carcass in a radial direction of the tire and comprised of at least two belt layers each containing many reinforcing cords embedded therein, the cords of which layers are crossed with each other with respect to an equatorial plane of the tire, a belt reinforcing member disposed at an inside of the belt in the radial direction and comprised of at least one ply having a width narrower than that of the belt and containing plural reinforcing elements embedded therein so as to extend in a circumferential direction of the tire while bending in form of wave or zigzag, and a tread rubber arranged at an outside of the belt in the radial direction.

In such a pneumatic tire, the belt reinforcing member controls the outward growth of tire size of a tread portion, particularly a shoulder portion in the radial direction during the inflation of an internal air pressure to a certain extent, whereby separation failure at a widthwise outer end portion of the belt is controlled to improve the belt durability.

However, the growth of the tire diameter in the tread portion increases with the flattening of the tire, so that the width of the belt reinforcing member should be made wide in accordance of the flattening degree (i.e. aspect ratio) of the tire. In this connection, when the width of the belt reinforcing member in the above pneumatic tire is further widened in accordance with the more flattening of the tire recently demanded (aspect ratio of not more than 0.7), there is caused a problem that the occurrence of belt end separation can not sufficiently be suppressed and particularly the separation failure is created at the widthwise outer end portion of the belt reinforcing member.

The inventors have made various studies with respect to the separation failure of the belt in the above pneumatic tire provided with the belt reinforcing member and have obtained the following knowledge. That is, when the tire rides on protrusions such as stones and the like scattered on road surface at a middle region between the equatorial plane and the tread end, during the running of the tire, the belt reinforcing member is pushed inward in the radial direction to form a dent portion. The degree of this dent portion is sharper in the widthwise direction than in the circumferential direction. For this end, when the tire rides over the protrusion, a large axial shearing strain is caused between the belt layers constituting the belt, and particularly a largest axial shearing strain is caused at an end of the belt layer, which brings about the occurrence of the belt end separation as mentioned above.

The inventors have made analyses with respect to the deformation of the belt as mentioned above and confirmed two causes as mentioned below. Firstly, the reinforcing elements of the belt layers constituting the belt are crossed at a small inclination angle with respect to the equatorial plane of the tire, usually within a range of 15–30° for effectively controlling the growth of tire diameter in the tread portion, while the reinforcing elements embedded in the belt reinforcing member extend in parallel to the equatorial plane of the tire as a whole as mentioned above, so that the bending rigidity of the belt and the belt reinforcing member in the widthwise direction of the tire as a whole is fairly low. Secondly, the belt reinforcing member bears a greater part of circumferential tension produced in the tire in the inflation of the internal air pressure because the reinforcing elements embedded in the belt reinforcing member extend in parallel to the equatorial plane, so that the rigidity rapidly lowers at an outer end of the belt reinforcing member in the axial direction, and hence when the belt reinforcing member is subjected to a force from the protrusion as mentioned above, it acts as a single deformable plate and concavely deforms at the axially outer end as a fulcrum (or fixed point).

Furthermore, the inventors have confirmed the following fact. That is, since the belt in a ground contact region is deformed so as to be flat and the reinforcing elements contained therein are inclined toward the side of the equatorial plane so as to extend in the circumferential direction, rubber surrounding the belt is dragged in the circumferential direction by such a deformation of the belt and also the dragged quantity of rubber becomes large near to the widthwise outer end of the belt. In the above tire, since the belt reinforcing member having a width narrower than that of the belt is arranged adjacent to the belt, rubber located near to the widthwise outer end of the belt reinforcing member is also dragged by the widthwise outer end portion of the belt and largely deformed. However, even if the belt reinforcing member is deformed so as to be flat together with the belt, the reinforcing element in the belt-reinforcing member extend in the circumferential direction, they are not further stretched in the circumferential direction and hence a great strain is produced in rubber near to the widthwise outer end of the belt reinforcing member, and also such a strain is repeatedly caused every the rotation of the tire. As a result, the separation failure is prematurely caused in the vicinity of the widthwise outer end of the belt reinforcing member.

SUMMARY OF THE INVENTION

The inventors have made further studies based on the above knowledge and found that the occurrence of separation failure can be controlled by arranging a belt protection member satisfying a given condition in addition to the belt reinforcing member, or by specifying a relation between widthwise outer ends of the belt and the belt reinforcing member.

According to a first aspect of the invention, there is the provision of a pneumatic radial tire comprising a carcass toroidally extending between a pair of bead portions and comprised of at least one rubberized ply containing a plurality of cords arranged substantially in a radial direction, a belt arranged at an outside of the carcass in the radial direction and comprised of at least two belt layers containing plural cords embedded therein, the cords of which layers being crossed with each other with respect to an equatorial plane of the tire, a belt reinforcing member arranged adjacent to the belt and comprised of at least one belt reinforcing layer containing a reinforcing element embedded therein and extending in a circumferential direction while bending in form of wave or zigzag, and a tread rubber arranged on an outside of the belt in the radial direction, in which a belt protection member containing many reinforcing elements embedded at an inclination angle with respect to the equatorial plane larger than that of the cord in the belt layer is disposed in the neighborhood of the belt and a widthwise outer end of the belt protection member is located outward from a widthwise outer end of the belt reinforcing member in an axial direction of the tire.

Thus, when the belt protection member having a width wider than that of the belt reinforcing member and having a high bending rigidity in the widthwise direction is disposed in the neighbor hood of the belt, the bending rigidity in the widthwise direction of the belt and the belt reinforcing member as a whole is increased by the belt protection member, while the fulcrum of deformation when being subjected to external force from a protrusion scattered on road surface is shifted outward from the widthwise outer end of the belt reinforcing member to the widthwise outer end of the belt protection member in the axial direction, so that the degree of dent portion produced in the belt becomes slow-moving and shearing strain produced between the belt layers in the widthwise direction becomes small and hence the occurrence of belt end separation is controlled.

In a preferable embodiment of the invention, the widthwise outer end of the belt protection member is located inward from the widthwise outer end of a belt layer having a minimum width among the belt layers in the widthwise direction. Thus, shearing strain produced between the belt and the belt protection member can be controlled to effectively prevent the separation failure therebetween.

In another preferable embodiment of the invention, the belt protection member is disposed on an outside of an outermost belt layer among the belt layers. Thus, the belt can effectively be protected from an external damage such as cut or the like, while the bending rigidity in the widthwise direction of the belt and the belt reinforcing member as a whole can effectively be increased because the belt protection member is far away from a neutral plane of the recess deformation.

In the other preferable embodiment of the invention, an inclining direction of the reinforcing element in the belt protection member is the same as an inclining direction of the cord in the belt layer adjacent to the belt protection member. Because, if the inclining direction of the reinforcing element in the belt protection member is opposite to the inclining direction of the cord in the belt layer, a great shearing strain is produced between the belt protection member and the belt layer to bring about the occurrence of separation failure.

In a further preferable embodiment of the invention, the inclination angle of the reinforcing element in the belt protection member is not less than 30°, preferably 40–70°. In this case, the bending rigidity in the widthwise direction of the belt reinforcing member and the belt as a whole can more effectively be increased while preventing the separation failure.

In a still further preferable embodiment of the invention, a cushion rubber layer is arranged between the widthwise outer end portion of the belt protection member and the widthwise outer end portion of the belt layer adjacent to the belt protection member, whereby shearing strain between the widthwise outer end portion of the belt protection member and the belt layer can effectively be mitigated to more control the separation failure therebetween.

According to a second aspect of the invention, there is the provision of a pneumatic radial tire comprising a carcass toroidally extending between a pair of bead portions and comprised of at least one rubberized ply containing a plurality of cords arranged substantially in a radial direction, a belt arranged at an outside of the carcass in the radial direction and comprised of at least two belt layers containing plural cords embedded therein, the cords of which layers being crossed with each other with respect to an equatorial plane of the tire, a belt reinforcing member arranged adjacent to the belt and comprised of at least one belt reinforcing layer containing a reinforcing element embedded therein and extending in a circumferential direction while bending in form of wave or zigzag, and a tread rubber arranged on an outside of the belt in the radial direction, in which a widthwise outer end of a belt reinforcing layer having a widest width among the belt reinforcing layers is located outward from a widthwise outer end of a belt layer having a widest width in an axial direction of the tire.

Thus, when the widthwise outer end of a belt reinforcing layer having a widest width among the belt reinforcing layers is located outward from the widthwise outer end of a belt layer having a widest width in a widthwise direction of the tire, rubber in the vicinity of the widthwise outer end portion of the widest-width belt reinforcing layer is separated away from the widthwise outer end of the widest-width belt layer largely deforming in the circumferential direction, so that it is not affected by such a deformation and hence the separation failure in the vicinity of the widthwise outer end of the widest-width belt reinforcing layer can effectively be prevented. In this case, the belt reinforcing member may be arranged inward or outward from the belt in the radial direction or between the belt layers constituting the belt.

In a preferable embodiment of the invention, when a maximum width of the carcass is L, the widthwise outer end of the widest-width belt reinforcing layer is located between a point P separated outward from the equatorial plane S by 0.375 times of L in the widthwise direction and a point Q separated outward from the equatorial plane S by 0.45 times of L in the widthwise direction. In this case, the outward growth of tire size in the tread portion can effectively be controlled and the distribution thereof can be uniformized while preventing the separation failure in the widthwise outer end of the widest-width belt reinforcing layer.

In another preferable embodiment of the invention, when the width of the widest-width belt layer is N, the widthwise outer end of the widest-width belt reinforcing layer is located outward from a point U separated by 0.05 times of N from the widthwise outer end of the widest-width belt layer in the widthwise direction. In this case, the deformation of the widest-width belt layer in the circumferential direction is hardly caused in the vicinity of the widthwise outer end of the widest-width belt reinforcing layer and hence the separation failure in such a widthwise outer end is more controlled.

BRIEF DESCRIPTION OF THE DRAWINGS

The invention will be described with reference to the accompanying drawings, wherein.

DESCRIPTION OF PREFERRED EMBODIMENTS

Figure 1:
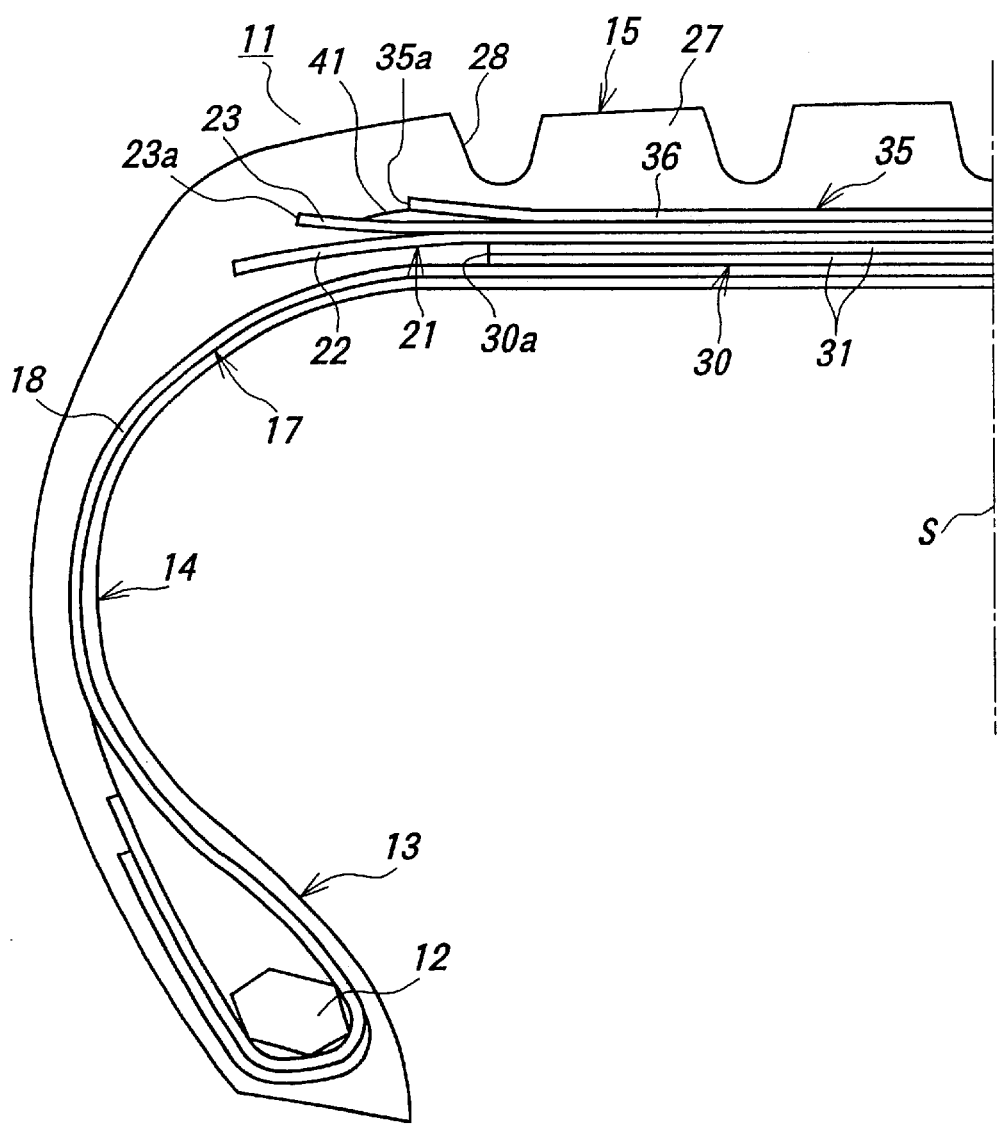
FIG. 1 is a diagrammatically radial-half section view of an embodiment of the pneumatic tire according to the first aspect of the invention.
Figure 2:
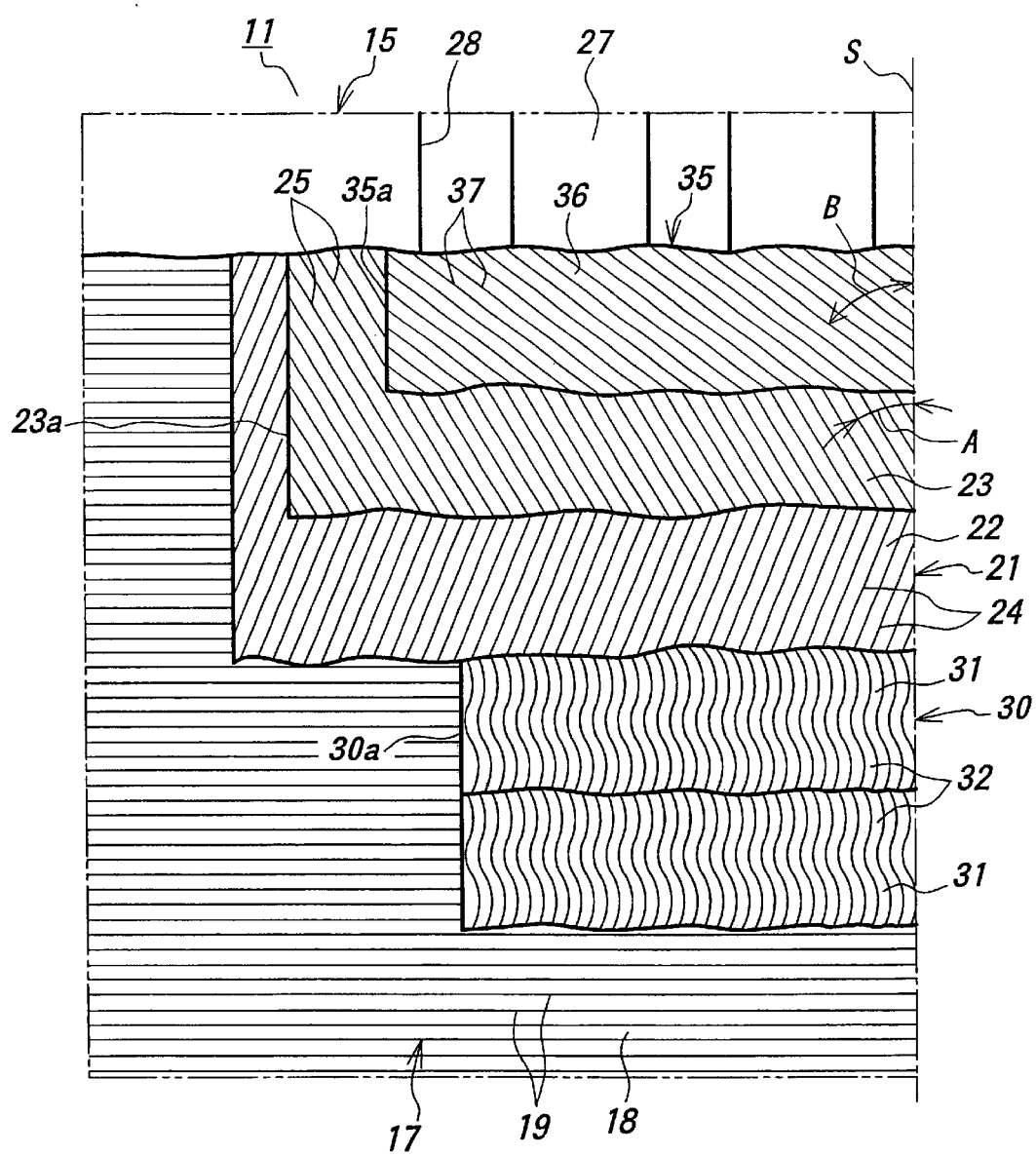
FIG. 2 is a partial developed view illustrating a lamination structure of carcass and belt in the pneumatic tire of FIG. 1.

In FIGS. 1 and 2, numeral 11 is a heavy duty pneumatic radial tire for truck and bus having an aspect ratio of not more than 0.70, preferably not more than 0.60. This tire 11 comprises a pair of bead portions 13 each embedding an annular bead core 12 therein, a pair of sidewall portions 14 each extending outward from each bead portion 13 in an approximately radial direction, and a tread portion 15 connecting radial outer ends of the sidewall portions 14 to each other. And also, the tire 11 comprises a carcass 17 toroidally extending between the pair of bead cores 12 and reinforcing the sidewall portions 14 and the tread portion 15 and comprised of at least one carcass ply 18 (one ply in the illustrated embodiment). In the carcass ply 18 are embedded many cords 19 extending substantially in the radial direction (meridional direction) of the tire. These cords are made of an inextensible material such as steel cord, aramid fiber cord or monofilament thereof.

A belt 21 controlling the growth of tire size due to the inflation under an internal pressure or the like is disposed at the outside of the carcass in the radial direction and comprised of two or more belt layers (first and second belt layers 22, 23 in the illustrated embodiment). In each of the belt layers 22, 23 are embedded many cords 24, 25 arranged at an inclination angle A of 10–30° with respect to an equatorial plane S of the tire, 22° in the illustrated embodiment. The cords 24, 25 are made of an inextensible material such as steel cord, aramid fiber cord or monofilament thereof. The inclining directions of the cords 24, 25 in the belt layers 22, 23 are opposite to each other. In the illustrated embodiment, the inclining direction of the cord 23 is upward to the right and that of the cord 24 is upward to the left. Moreover, when the number of the belt layers is 3 or more, the cords on and after the third belt layer are inclined in the same direction as in the cord 24 or 25.

A tread 27 is disposed at the outside of the belt 21 in the radial direction and provided on its outer surface with grooves 28 such as main grooves, lateral grooves and the like.

Numeral 30 is a belt reinforcing member interposed between the carcass 17 and the belt 21 and has a width narrower than that of a minimum-width belt layer, the second belt layer 23 in the illustrated embodiment. The belt reinforcing member 30 is comprised of at least one belt reinforcing layer 31 (two belt reinforcing layers in the illustrated embodiment). In each of the belt reinforcing layers 31 is embedded a reinforcing element 32 extending substantially in parallel to the equatorial plane S. The reinforcing element 32 is made of an inextensible material such as steel cord, aramid fiber cord or monofilament thereof and bent in a wavy form having substantially the same wavelength such as sine curve, square curve, chopping wave or zigzag in a plane parallel to front and rear surfaces of the belt reinforcing layer 31. And also, each of the belt reinforcing layers 31 is constituted by spirally winding a rubberized ribbon-shaped body containing few reinforcing elements 32 on the outside of the carcass 17 many times.

Numeral 35 is a belt protection member disposed adjacent to the belt 21 and comprised of at least one belt protection layer 36 (one belt protection layer in the illustrated embodiment), wherein a widthwise outer end 35a of the belt protection member 35 is located outward from a widthwise outer end 30a of the belt reinforcing member 30 in the widthwise direction. In the belt protection layer 36 are embedded many reinforcing elements 37 each made of an inextensible material such as steel cord, aramid fiber cord or monofilament thereof, wherein an inclination angle B of the reinforcing element 37 with respect to the equatorial plane S is larger than the inclination angle A of the cord 24, 25 in the belt layers 22, 23 with respect to the equatorial plane S. When the belt protection member 35 having a width wider than that of the belt reinforcing member 30 and being high in the bending rigidity in the widthwise direction is disposed on the belt 21 so as to be laid thereon, the bending rigidity in the widthwise direction of the belt 21 and the belt reinforcing member 30 as a whole is increased by the belt protection member 35 and also when the tire is subjected to external force from the protrusion scatted on road surface, the fulcrum of the deformation is shifted outward from the widthwise outer end 30a of the belt reinforcing member 30 to the widthwise outer end 35a of the belt protection member 35 in the widthwise direction and hence the degree of dent portion produced in the belt 21 becomes slow-moving and shearing strain produced between the first and second belt layers 22, 23 in the widthwise direction becomes small, whereby the occurrence of separation failure at the belt end is controlled.

It is favorable that the widthwise outer end 35a of the belt protection member 35 is located inward from the widthwise outer end 23a of the minimum-width belt layer, the second belt layer 23 in the illustrated embodiment in the widthwise direction. In this case, the shearing strain produced between the belt protection member 35 and the belt 21 can be controlled to effectively prevent the separation failure therebetween.

And also, it is favorable that the belt protection member 35 is disposed outward on an outermost belt layer, the second belt layer 23 in the illustrated embodiment in the radial direction. In this case, the belt 21 can effectively be protected from external damage such as cut failure or the like. And also, the belt protection member 35 is far away from a neutral plane of the recess deformation, so that the bending rigidity in axial direction of the belt 21 and the belt reinforcing member 30 as a whole can effectively be increased.

Moreover, the belt protection member 35 may be disposed between the carcass 17 and the belt reinforcing member 30, or between the belt reinforcing member 30 and the belt 21, or between the first and second belt layers 22, 23 of the belt 21. In this case, the bending rigidity in axial direction of the belt 21 and the belt reinforcing member 30 can be increased to a certain extent.

Furthermore, it is favorable that the inclining direction of the reinforcing element 37 in the belt protection member 35 with respect to the equatorial plane S is the same as the inclining direction of the cord 25 in the second belt layer 23 adjacent to the belt protection member 35 and is upward to the left in the illustrated embodiment. If both the inclining directions are opposite to each other, there is a fear of producing a great shearing strain between the belt protection member 35 and the belt 21, concretely the second belt layer 23 to cause the separation failure. However, when the inclining directions are the same as mentioned above, the shearing strain produced between the belt protection member 35 and the belt 21 becomes small and hence the occurrence of separation failure therebetween can be prevented.

The inclination angle B of the reinforcing element 37 in the belt protection member 35 with respect to the equatorial plane S is favorable to be not less than 30° for effectively increasing the bending rigidity in widthwise direction of the belt 21 and the belt reinforcing member 30 as a whole. When the inclination angle B is within a range of 40–70°, the bending rigidity in widthwise direction of the belt 21 and the belt reinforcing member 30 as a whole can considerably be increased while preventing the separation failure between the belt 21 and the belt protection member 35.

As shown in the illustrated embodiment, a cushion rubber layer 41 is disposed between the widthwise outer end portion of the belt protection member 35 and the widthwise outer end portion of the second belt layer 23 adjacent thereto so as to make a distance between the reinforcing element 37 and the cord 25 at widthwise outer end portions of the belt protection layer 36 and the second belt layer 23 larger than a total value of coating rubber gauge for the belt protection layer 36 and coating rubber gauge for the second belt layer 23. As the inclination angle B of the reinforcing element 37 in the belt protection member 35 becomes large, the shearing strain between the widthwise outer end portions of the belt protection member 35 and the belt 21 increases, but the use of the cushion rubber layer as mentioned above effectively absorbs and buffers such an increased shearing strain to control the occurrence of the separation failure. In order to ensure the control of the separation failure, it is favorable to use the cushion rubber layer 41 having such a thickness that the distance between the reinforcing element 37 and the cord 25 at the widthwise outer end portions of the belt protection member 25 and the second belt layer 23 is not less than 1.5 mm.

Figure 3:
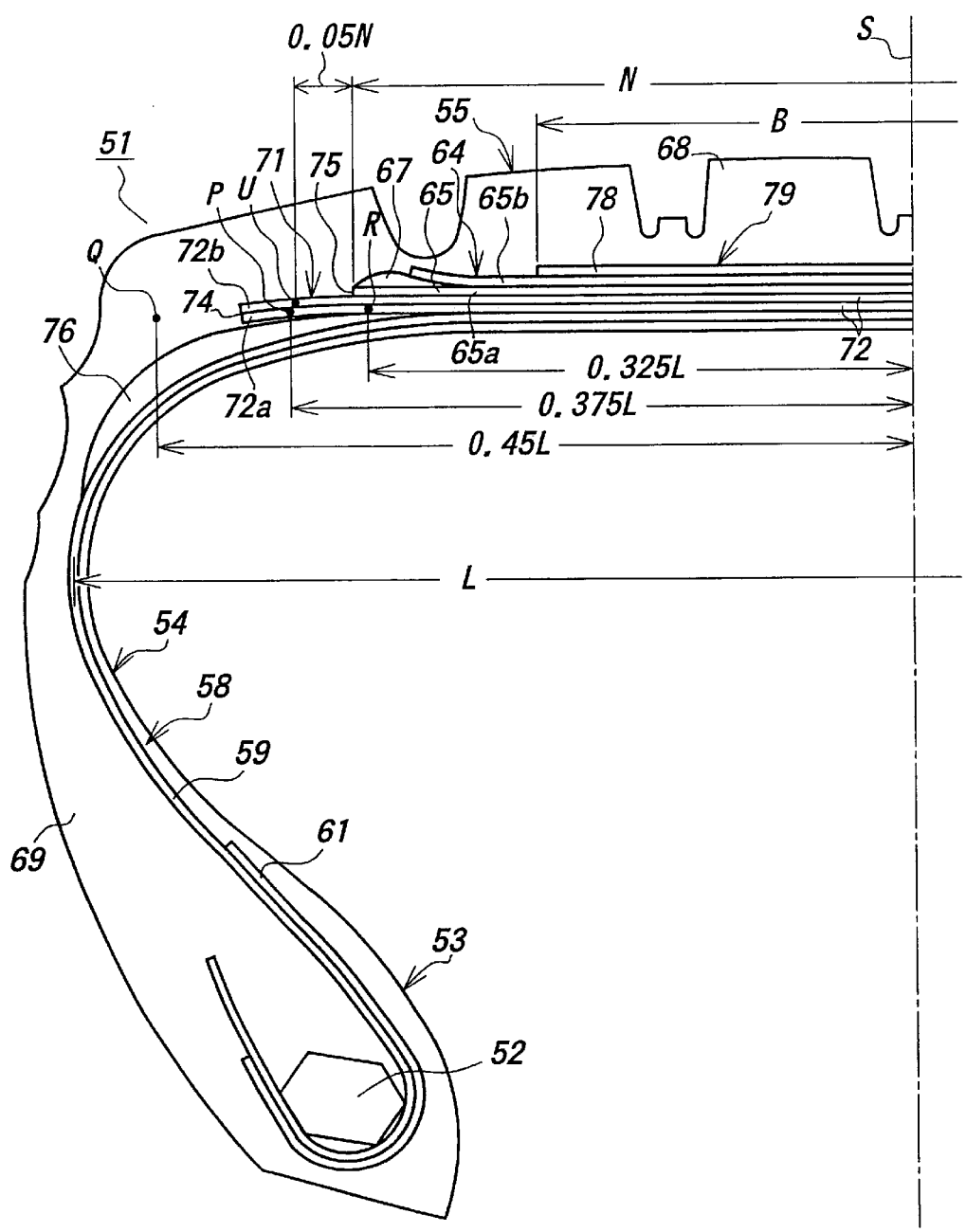
FIG. 3 is a diagrammatically radial-half section view of an embodiment of the pneumatic tire according to the second aspect of the invention.
Figure 4:
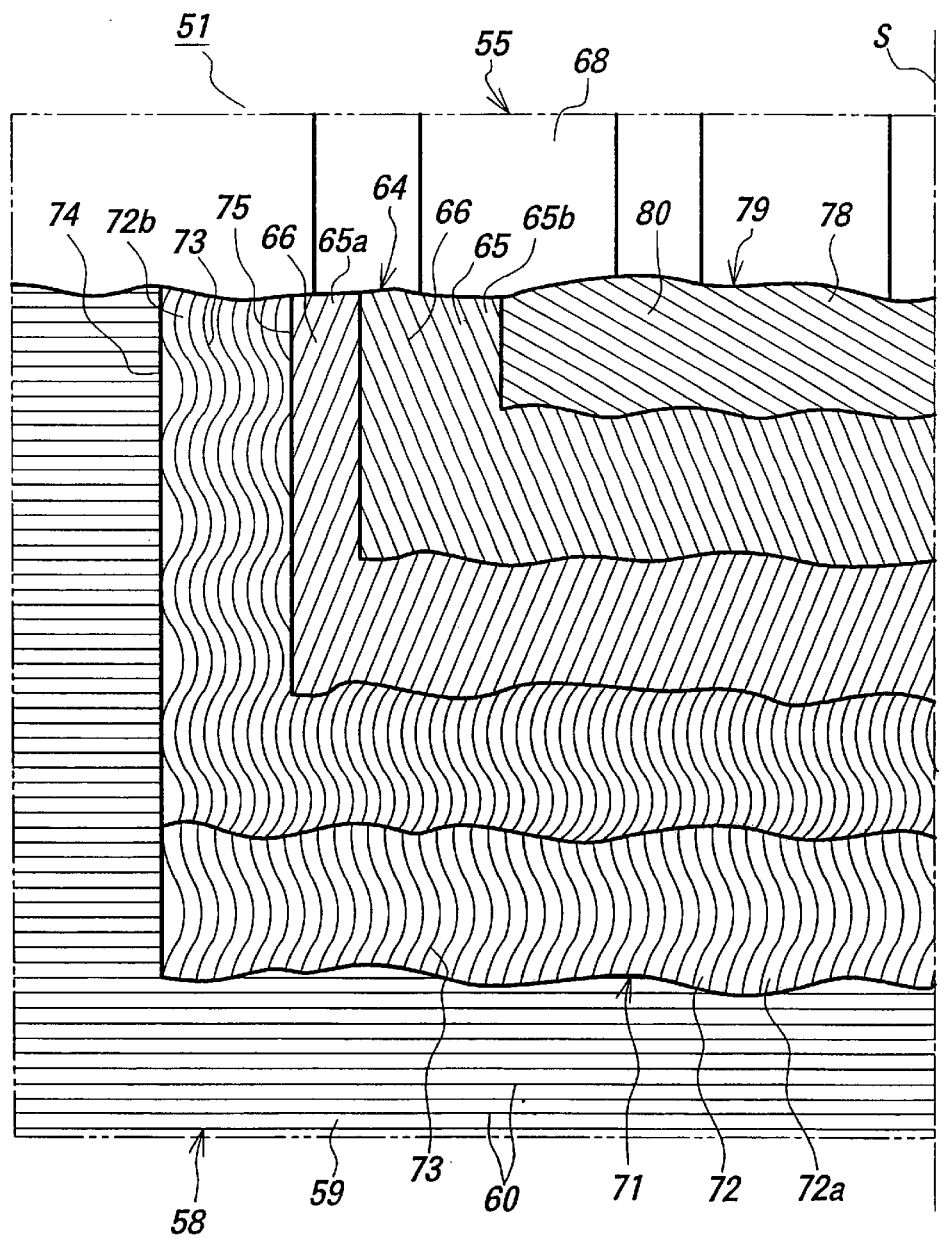
FIG. 4 is a partial developed view illustrating a lamination structure of carcass and belt in the pneumatic tire of FIG. 3.

In FIGS. 3 and 4, numeral 51 is a heavy duty pneumatic radial tire for truck and bus having an aspect ratio of not more than 0.70, preferably not more than 0.60. This tire 51 comprises a pair of bead portions 53 each embedding an annular bead core 52 therein, a pair of sidewall portions 54 each extending outward from each bead portion 53 in an approximately radial direction, and a tread portion 55 connecting radial outer ends of the sidewall portions 54 to each other. And also, the tire 51 comprises a carcass 58 toroidally extending between the pair of bead cores 52 and reinforcing the sidewall portions 54 and the tread portion 55 and both end portions of the carcass 58 are wound around the bead cores 52 from the inside of the tire toward the outside thereof, respectively. The carcass 58 is comprised of at least one carcass ply 59 (one ply in the illustrated embodiment). In the carcass ply 59 are embedded many inextensible cords 19 such as steel cords extending substantially in the radial direction (meridional direction) of the tire. And also, a chafer 21 reinforced with, for example, steel cords is arranged about the carcass 58 in the bead portion 53.

Numeral 64 is a belt disposed at the outside of the carcass 58 in the radial direction and comprised of at least two belt layers 65 (two belt layers in the illustrated embodiment). In each of the belt layers 65 are embedded many inextensible cords 66 such as steel cords, aramid fiber cords. The cords 66 embedded in the belt layers 65 are inclined at an angle of 10–70° with respect to the equatorial plane S, wherein the inclining directions of the cords in at least two belt layers 65 are opposite to each other. In this case, the inner belt layer 65a located inward in the radial direction has a width wider than that of the outer belt layer 65b located outward in the radial direction. That is, the inner belt layer 25a is a widest-width belt layer and the outer belt layer 65b is a narrow-width belt layer in the illustrated embodiment. Furthermore, a cushion rubber 67 is interposed between widthwise outer end portions of the widest-width belt layer 65a and the narrow-width belt layer 65b so as to mitigate strain therebetween.

Numeral 68 is a tread rubber disposed at the outsides of the carcass 58 and the belt 64 in the radial direction, and numeral 69a side rubber arranged at the outside of the carcass 58.

Numeral 71 is a belt reinforcing member disposed at the inside of the belt 64 and at the outside of the carcass 58 in the radial direction or interposed between the carcass 58 and the belt 64 and comprised of at least one belt reinforcing layer 72 (two belt reinforcing layers in the illustrated embodiment). In each of the belt reinforcing layers 72 is embedded a reinforcing element 73 extending substantially in the circumferential direction and made of an inextensible material such as steel cord, aramid fiber cord or monofilament thereof, wherein many reinforcing elements are existent in a meridional section of each belt reinforcing layer 72. The reinforcing element 73 is bent in a wavy form having substantially-the same phase such as sine curve, square curve, chopping wave or zigzag in a plane parallel to front and rear surfaces of the belt reinforcing layer 72. In the illustrated embodiment, the inner belt reinforcing layer 72a located inward in the radial direction and the outer belt reinforcing layer 72b located outward adjacent thereto in the radial direction have the same width. And also, each of the belt reinforcing layers 72 is constituted by spirally winding a rubberized ribbon-shaped body containing few reinforcing elements 73 on the outside of the carcass 58 many times.

The widthwise outer ends 74 of the belt reinforcing layers 72a, 72b are located outward from the widthwise outer end 75 of the widest-width belt layer 65a in the widthwise direction. Thus, rubber in the vicinity of the widthwise outer end portions of the belt reinforcing layers 72a, 72b is far away from the widthwise outer-end of the widest-width belt layer 65a largely deforming in the circumferential direction, so that it is hardly affected by such a deformation and hence strain of rubber located in the vicinity of the widthwise outer ends of the belt reinforcing layers 72a, 72b is decreased to effectively control the separation failure. Moreover, numeral 76 is a cushion rubber layer interposed between the widthwise outer end portion of the belt reinforcing member 71 and the carcass 58.

Since a portion of the tread 55 indicating a greatest growth of tire size under an inflation of an internal pressure is usually located between a point R separated outward from an equatorial plane S of the tire by 0.325 times of L in the widthwise direction and a point P separated outward from the equatorial plane S by 0.375 times of L in the widthwise direction when a maximum width of the carcass 58 is L, it is favorable that the widthwise outer ends of the belt reinforcing layers 72a, 72b are located outward from the point P in the widthwise direction in order to strongly restrain the above growth of tire size to uniformize such a growth of tire size in the tread 55. However, when the widthwise outer ends 74 of the belt reinforcing layers 72a, 72b are located outward from a point Q separated outward from the equatorial plane S by 0.45 times of L in the widthwise direction, there is a fear of causing the separation failure at the widthwise outer ends 74 of the belt reinforcing layers 72a. 72b, so that it is favorable that the widthwise outer ends 74 of the belt reinforcing layers 72a, 72b are located inward from the point Q in the widthwise direction. From this point, it is preferable that the widthwise outer ends 74 of the belt reinforcing layers 72a, 72b are located between the point P and the point Q.

When a full width of the widest-width belt layer 65a is N, it is preferable that the widthwise outer ends 74 of the belt reinforcing layers 72a, 72b are located outward from a point U separated by 0.05 times of N from the widthwise outer end 75 of the widest-width belt layer 65a in the widthwise direction. Thus, the widthwise outer ends 74 of the belt reinforcing layers 72a, 72b are far away from the widthwise outer end 75 of the widest-width belt layer 65a in the widthwise direction, so that rubber in the vicinity of the widthwise outer end 74 is hardly affected by the deformation of the widest-width belt layer 65a in the circumferential direction and hence the separation failure at this position can more strongly be controlled.

Among belt layers 75 constituting the belt 64, a radially outermost belt layer or a narrow-width belt layer 65b in the illustrated embodiment bears a greater part of tension when an inclination angle of the cords 66 embedded in the belt layer 65b with respect to the equatorial plane S is less than 30° (22° in the illustrated embodiment), so that there may be broken the cords 66 in the belt layer 65b when an input from the protrusion is given to the tread 55 during the running of the tire. For this end, a belt protection member 79 comprised of at least one belt protection layer 78 is disposed on the outside of the narrow-width belt layer 65b in the radial direction in the illustrated embodiment for controlling the above breakage of the cords 66. In order to control the breakage of the cord 66, the belt protection member 79 is constructed so that an inclination angle of a reinforcing element embedded in the belt protection member is made equal to or more than the inclination angle of the cord in the belt layer 65 to decrease the tension bearing of the belt protection member itself. In this case, a plurality of inextensible reinforcing elements such as steel cords, aramid fiber cords or the like are embedded in the belt protection layer 78 constituting the belt protection member 79 so as to be inclined with respect to the equatorial plane S. And also, it is favorable that a width B of the belt protection member 79 is within a range of from 0.3 times of L to a width equal to that of the belt reinforcing layers 72a, 72b. When the width B of the belt protection member 79 is less than 0.3 times of L, the belt protection member can not cover a high tension region of the belt 64, while when it exceeds the width of the belt reinforcing layer 72a, 72b, the separation failure is caused at the widthwise outer end of the belt protection member 79.

Although the belt reinforcing member 71 is arranged at the inside of the belt 64 in the radial direction in the illustrated embodiment, various modifications may be taken within a scope of the invention. For example, the belt reinforcing member 71 may be disposed between the belt layers constituting the belt, for example, between the widest-width belt layer and the narrow-width belt layer or may be arranged on the outside of the belt in the radial direction. In the latter case, there is feared the breakage of the reinforcing elements extending in the circumferential direction in the belt reinforcing member due to the input from the protrusion, so that it is desirable to arrange the same belt protection member as mentioned above on the outside of the belt reinforcing member in the radial direction.

The following examples are given in illustration of the invention and are not intended as limitations thereof.

EXAMPLE 1

There are provided a conventional tire, comparative tires 1–3 and test tires 1–14, respectively, wherein each of these tires has a tire size of 285/60R22.5 and widths of first and second belt layers are 240 mm and 220 mm, respectively, and inclination angles of cords in the first and second belt layers are 22° with respect to the equatorial plane, respectively, and the width of the belt reinforcing member is 160 mm.

The conventional tire is not provided with a belt protection member. In the comparative tire 1, the inclination angle B of the reinforcing element in the belt protection member is the same as the inclination angle A of the cord in the belt and the width of the belt protection member is narrower than the width of the belt reinforcing member (the widthwise outer end of the belt protection member is located inward from the widthwise outer end of the belt reinforcing member in the widthwise direction). In the comparative tire 2, the inclination angle B of the reinforcing element in the belt protection member is the same as the inclination angle A of the cord in the belt likewise the comparative tire 1, but the width of the belt protection member is wider than the width of the belt reinforcing member (the widthwise outer end of the belt protection member is located outward from the widthwise outer end of the belt reinforcing member in the widthwise direction). In the comparative tire 3, the inclination angle B of the reinforcing element in the belt protection member is larger than the inclination angle A of the cord in the belt but the width of the belt protection member is narrower than the width of the belt reinforcing member (the widthwise outer end of the belt protection member is located inward from the widthwise outer end of the belt reinforcing member in the widthwise direction).

In the test tires 1–14, the width of the belt protection member is wider than the width of the belt reinforcing member (the widthwise outer end of the belt protection member is located outward from the widthwise outer end of the belt reinforcing member in the widthwise direction) and the inclination angle B of the reinforcing element in the belt protection member is larger than the inclination angle A of the cord in the belt. In the test tires 1–7, the inclination angle B is gradually increased toward the test tire 7 provided that the other dimensions are the same. The width of the belt protection member is smaller than the width of the minimum-width belt layer (the widthwise outer end of the belt protection member is located inward from the widthwise outer end of the minimum-width belt layer in the radial direction) in the test tires 1–7, but the width of the belt protection member is larger than the width of the minimum-width belt layer (the widthwise outer end of the belt protection member is located outward from the widthwise outer end of the minimum-width belt layer in the radial-direction) in the test tire 8.

Further, the belt protection member is arranged on the outside of the outermost belt layer in the radial direction in the test tires 1–7, while the belt protection member is arranged between the belt reinforcing member and the belt (shown by X in Table 1) in the test tire 9, between the carcass and the belt reinforcing member (shown by Y in Table 1) in the test tire 10, and between the two belt layers constituting the belt (shown by Z in table 1) in the test tire 11. In the test tires 1–7, the inclining direction of the reinforcing element in the belt protection member is the same as the inclining direction of the cord in the belt layer adjacent to the belt protection member, while the inclining direction of the reinforcing element in the belt protection member is opposite to the inclining direction of the cord in the belt layer adjacent to the belt protection member in the test tire 12.

In the test tires 1–7, a cushion rubber layer is disposed between the widthwise outer end portion of the belt protection member and the widthwise outer end portion of the belt layer adjacent thereto so that a rubber gauge between the reinforcing element of the belt protection member and the cord of the belt layer is 1.5 mm, while in the test tire 13, the use of the cushion rubber layer is omitted so that the rubber gauge between the reinforcing element and the cord is 0.6 mm. And also, the width of the belt protection member is 190 mm in the test tires 1–7, while the width of the belt protection member in the test tire 14 is somewhat narrower than those of the test tires 1–7 and is 170 mm.

In Table 1 are shown concrete numerical values of width of belt protection member (mm), inclination angle of reinforcing element in belt protection member with respect to equatorial plane or inclination angle (degree) of reinforcing element and rubber gauge (mm) between reinforcing element in widthwise outer end of belt protection member and cord in widthwise outer end of belt layer adjacent thereto and position of belt protection member arranged, respectively.

Each of these tires is mounted onto a rim of 9.00×22.5 and inflated under an internal pressure of 9.0 kgf/cm$^2$ and run on a drum provided with protrusions at a speed of 60 km/h under a load of 3150 kg until the occurrence of the failure (separation failure) in the belt or belt protection member to measure a running distance. The result is also shown by an index on the basis that the conventional tire is 100 in Table 1, wherein an index value of not less than 120 is a commercially required level and an index value of not less than 140 is a preferable value. The failure position is also shown in Table 1, wherein "between belt layers" means that the separation failure is caused between the widthwise outer end portions of the first and second belt layers and "outermost layer end" means that the separation failure is caused at the widthwise outer end of the belt protection member.

As seen from Table 1, the comparative tires 1–3 can not substantially control the occurrence of separation failure though the running distance is somewhat increased as compared with the conventional tire. In the test tires 1–7, as the inclination angle of the reinforcing element in the belt protection member becomes large, the effect of controlling the separation failure becomes high, but when the inclination angle exceeds 70°, the separation failure is caused at the widthwise outer end of the belt protection member and the running distance becomes short. Further, the effect of controlling the occurrence of separation failure becomes larger in the test tire 5 as compared with the case that the widthwise outer end of the belt protection member is located inward from the widthwise outer end of the minimum-width belt layer in the widthwise direction as in the test tire 8, or that the belt protection member is arranged between the belt reinforcing member and the belt or between the carcass and the belt reinforcing member or between the belt layers of the belt as in the test tires 9–11, or that the inclining direction of the reinforcing element in the belt protection member is opposite to the inclining direction of the cord in the belt layer adjacent thereto as in the test tire 12, or that the cushion rubber layer is omitted between the widthwise outer end portion of the belt protection member and the widthwise outer end portion of the belt layer adjacent thereto as in the test tire 13.

EXAMPLE 2

There are provided a conventional tire 2 wherein a belt reinforcing member is disposed between a carcass and a belt and widthwise outer ends of belt reinforcing layers constituting the belt reinforcing member are located inward from a widthwise outer end of a widest-width belt layer in the belt in the widthwise direction, a conventional tire 2 wherein a belt reinforcing member is disposed on an outside of a belt in the radial direction and width-wise outer ends of belt reinforcing layers constituting the belt reinforcing member

TABLE 1

|  | Conventional tire | Comparative tires | | | Test tires | | | | |
| --- | --- | --- | --- | --- | --- | --- | --- | --- | --- |
|  |  | 1 | 2 | 3 | 1 | 2 | 3 | 4 | 5 |
| Width of belt protection member | — | 120 | 190 | 120 | 190 | 190 | 190 | 190 | 190 |
| Inclination angle of reinforcing element | — | 22 | 22 | 52 | 25 | 30 | 40 | 52 | 66 |
| Rubber gauge | — | 1.5 | 1.5 | 1.5 | 1.5 | 1.5 | 1.5 | 1.5 | 1.5 |
| Position of belt protection member | — | outermost side | outermost side | outermost side | outermost side | outermost side | outermost side | outermost side | outermost side |
| Running distance on drum | 100 | 100 | 102 | 112 | 112 | 122 | 147 | 157 | 159 |
| Failure position | between belt layers | between belt layers | between belt layers | between belt layers | between belt layers | between belt layers | between belt layers | between belt layers | between belt layers |

|  | Test tires | | | | | | | | |
| --- | --- | --- | --- | --- | --- | --- | --- | --- | --- |
|  | 6 | 7 | 8 | 9 | 10 | 11 | 12 | 13 | 14 |
| Width of belt protection member | 190 | 190 | 230 | 190 | 190 | 190 | 190 | 190 | 170 |
| Inclination angle of reinforcing element | 70 | 75 | 66 | 66 | 66 | 66 | −66 | 66 | 66 |
| Rubber gauge | 1.5 | 1.5 | 1.5 | 1.5 | 1.5 | 1.5 | 1.5 | 0.6 | 1.5 |
| Position of belt protection member | outermost side | outermost side | outermost side | X | Y | Z | outermost side | outermost side | outermost side |
| Running distance on drum | 149 | 124 | 128 | 123 | 126 | 121 | 122 | 126 | 141 |
| Failure position | between belt layers | outermost layer end | outermost layer end | between belt layers | between belt layers | between belt layers | outermost layer end | outermost layer end | between belt layers | are located inward from a widthwise outer end of a widest-width belt layer in the belt in the widthwise direction, test tires 15–27 wherein a belt reinforcing member is disposed between a carcass and a belt and widthwise outer ends of belt reinforcing layers constituting the belt reinforcing member are located outward from a widthwise outer end of a widest-width belt layer in the belt in the widthwise direction, test tires 28, 29 wherein a belt reinforcing member is disposed on an outside of a belt in the radial direction and widthwise outer ends of belt reinforcing layers constituting the belt reinforcing member are located outward from a widthwise outer end of a widest-width belt layer in the belt in the widthwise direction, and test tires 30–34 wherein a belt reinforcing member is disposed between two belt layers constituting the belt and widthwise outer ends of belt reinforcing layers constituting the belt reinforcing member are located outward from a widthwise outer end of a widest-width belt layer in the belt in the widthwise direction.

Moreover, a belt protection member is arranged on an outside of the belt in the conventional tire 2, on an outside of the belt reinforcing member in the conventional tire 3, on an outside of the belt in the test tires 15–25, on an outside of the belt reinforcing member in the test tires 28–29, on an outside of an outermost belt layer in the test tire 30 in the radial direction, respectively.

Each of these tires has a tire size of 285/60R22.5.

In Table 2 are shown half-widths of two belt layers constituting the belt (half-width of inner belt layer/half-width of outer belt layer, mm), inclination angles of cords in the two belt layers (inclination angle of cord in inner belt layer/inclination angle of cord in outer belt layer, degree), half-width of the belt reinforcing member (mm), F-value obtained by dividing a half-width of the belt reinforcing member by a maximum width of the carcass, G-value obtained by dividing a value of subtracting half-width of a widest-width belt layer from half-width of the belt reinforcing member by full width of the widest-width belt layer, and half-width of a belt protection member (mm).

Then, each of these tires is mounted onto a rim of 9.00×22.5 and inflated under an internal pressure of 9.0 kgf/cm$^2$ to measure a growth of tire size in a tread portion. Further, the tire is run on a drum at a speed of 60 km/h under a load of 5000 kg until the occurrence of separation failure at the widthwise outer end of the belt reinforcing member. The running distance is represented by an index on the basis that the conventional tire 2 is 100. The measured results are also shown in Table 2.

TABLE 2

|  | Conventional tires | | Test tires | | | | | | | | |
| --- | --- | --- | --- | --- | --- | --- | --- | --- | --- | --- | --- |
|  | 2 | 3 | 15 | 16 | 17 | 18 | 19 | 20 | 21 | 22 | 23 |
| Half width of belt layer | 120/110 | 120/110 | 90/80 | 90/80 | 80/70 | 80/70 | 70/60 | 90/80 | 90/80 | 90/80 | 90/80 |
| Inclination angle of cord in belt layer | 22/22 | 22/22 | 22/22 | 22/22 | 22/22 | 22/22 | 22/22 | 22/22 | 22/22 | 22/22 | 22/22 |
| Half width of belt reinforcing member | 110 | 105 | 110 | 120 | 110 | 110 | 110 | 96 | 103 | 124 | 129 |
| F value | 0.40 | 0.40 | 0.40 | 0.44 | 0.40 | 0.40 | 0.40 | 0.35 | 0.375 | 0.45 | 0.47 |
| G value | −0.04 | −0.06 | 0.111 | 0.167 | 0.188 | 0.188 | 0.286 | 0.033 | 0.065 | 0.189 | 0.217 |
| Half width of belt protection member | 60 | 105 | 60 | 60 | 60 | 90 | 50 | 60 | 60 | 60 | 60 |
| Maximum growth of tire size | 0.37 | 0.36 | 0.40 | 0.38 | 0.41 | 0.38 | 0.44 | 0.59 | 0.46 | 0.34 | 0.31 |
| Running distance on drum | 100 | 94 | 142 | 146 | 138 | 134 | 137 | 114 | 136 | 136 | 118 |
|  | Test tires | | | | | | | | | | |
|  | 24 | 25 | 26 | 27 | 28 | 29 | 30 | 31 | 32 | 33 | 34 |
| Half width of belt layer | 99/89 | 103/93 | 80/70 | 80/70 | 90/80 | 80/70 | 90/80 | 90/80 | 90/80 | 90/80 | 90/80 |
| Inclination angle of cord in belt layer | 22/22 | 22/22 | 35/35 | 50/50 | 22/22 | 22/22 | 22/22 | 35/35 | 50/50 | 52/52 | 67/67 |
| Half width of belt reinforcing member | 110 | 110 | 110 | 110 | 110 | 110 | 110 | 110 | 110 | 110 | 110 |
| F value | 0.40 | 0.40 | 0.40 | 0.40 | 0.40 | 0.40 | 0.40 | 0.40 | 0.40 | 0.40 | 0.40 |
| G value | 0.056 | 0.034 | 0.188 | 0.188 | 0.111 | 0.188 | 0.111 | 0.111 | 0.111 | 0.111 | 0.111 |
| Half width of belt protection member | 60 | 60 | none | none | 80 | 80 | 60 | none | none | none | none |
| Maximum growth of tire size | 0.39 | 0.37 | 0.44 | 0.48 | 0.38 | 0.40 | 0.38 | 0.44 | 0.48 | 0.48 | 0.48 |
| Running distance on drum | 137 | 112 | 136 | 135 | 137 | 135 | 138 | 135 | 132 | 132 | 132 |

As mentioned above, according to the invention, the occurrence of separation failure due to the deformation based on the riding on the protrusion as well as the occurrence of separation failure in the vicinity of the widthwise outer end of the belt reinforcing member can effectively be prevented while controlling the outward growth of tire size in the tread portion.

What is claimed is:

1. A pneumatic radial tire comprising; a carcass toroidally extending between a pair of bead portions and comprised of at least one rubberized ply containing a plurality of cords arranged substantially in a radial direction, a belt arranged at an outside of the carcass in the radial direction and comprised of at least two belt layers containing plural cords embedded therein, the cords of said belt layers being crossed with each other with respect to an equatorial plane of the tire, a belt reinforcing member arranged inside the belt in the radial direction and comprised of at least one belt reinforcing layer and a tread rubber arranged outside the belt in the radial direction, a widthwise outer end of a belt reinforcing layer having a widest width among the belt reinforcing layers is located outward from a widthwise outer end of a belt layer having a widest width in a widthwise direction of the tire, and wherein when a maximum width of the carcass is L, the widthwise outer end of the widest-width belt reinforcing layer is located between a point P separated outward from the equatorial plane S by 0.375 times of L in the widthwise direction and a point Q separated outward from the equatorial plane S by 0.45 times of L in the widthwise direction, and said at least one belt reinforcing layer comprises a reinforcing element embedded therein and extending in a circumferential direction while having a wave or zigzag form.

2. A pneumatic tire according to claim 1, wherein when the width of the widest-width belt layer is N, the widthwise outer end of the widest-width belt reinforcing layer is located outward from a point U separated by 0.05 times of N from the widthwise outer end of the widest-width belt layer in the widthwise direction.

3. A pneumatic tire according to claim 1 further comprising a second belt reinforcing member adjacent to said at least one belt reinforcing member and arranged radially inside said belt.

4. A pneumatic tire according to claim 1 wherein said at least one belt reinforcing member comprises an inextensible element embedded therein.

* * * * *